United States Patent [19]

Föller et al.

[11] Patent Number: 4,586,653
[45] Date of Patent: May 6, 1986

[54] DISCHARGE DEVICE FOR A CONDENSATE CONTROLLED BY A BIMETALLIC SNAP DISC

[75] Inventors: Werner Föller, Stuhr; Josef Lingnau; Theodor Flessner, both of Bremen, all of Fed. Rep. of Germany

[73] Assignee: GESTRA-KSB Vertriebsgesellschaft mbH & Co. Kommanditgesellschaft, Bremen, Fed. Rep. of Germany

[21] Appl. No.: 476,135

[22] Filed: Mar. 17, 1983

[30] Foreign Application Priority Data

Mar. 20, 1982 [DE] Fed. Rep. of Germany ....... 3210317

[51] Int. Cl.⁴ .................................................. F16T 1/08
[52] U.S. Cl. ..................................... 236/48 R; 236/59; 236/93 R
[58] Field of Search ...................... 236/48 R, 59, 93 R, 236/101 B, 101 E

[56] References Cited

U.S. PATENT DOCUMENTS

| | | | |
|---|---|---|---|
| 1,656,392 | 1/1928 | Russell et al. | 236/59 |
| 1,972,169 | 9/1934 | Spencer | 236/101 E X |
| 2,271,850 | 2/1942 | Zinkil | 236/93 R X |
| 2,590,112 | 3/1952 | MacCracken et al. | 236/93 R X |
| 2,764,353 | 9/1956 | Lavalee et al. | 236/59 |
| 3,790,076 | 2/1974 | Wichtel | 236/101 B X |
| 3,799,432 | 3/1974 | Schneider | 236/48 R |
| 3,853,268 | 12/1974 | Schneider | 236/48 R |
| 4,142,677 | 3/1979 | Ludwig | 236/48 R X |
| 4,311,272 | 1/1982 | Foller | 236/59 |

*Primary Examiner*—William E. Tapolcai
*Attorney, Agent, or Firm*—Collard, Roe & Galgano

[57] ABSTRACT

In a discharge device for a condensate operative within a given temperature range, and including a housing, a valve seat disposed in the housing, a closure part cooperating with the valve seat and subjected to an inlet pressure, a bimetallic snap disc carrying the closure part, being supported in the housing, subjected to the inlet pressure, and moving towards the valve seat upon an increase of temperature within the temperature range, the improvement includes an entrainment device carried by the closure part and connected to the bimetallic snap disc, wherein the closure part and the bimetallic snap disc define a central axis, and the closure part is movable along a path defined by the axis relative to the bimetallic snap disc, the bimetallic snap disc has an opening snap stroke, a closing snap stroke, and a snap stroke portion common with the opening and closing snap strokes, and exerting in a predetermined region a force in a closing direction, and wherein the valve seat is disposed within the predetermined region and within the common snap stroke portion.

5 Claims, 4 Drawing Figures

DISCHARGE DEVICE FOR A CONDENSATE CONTROLLED BY A BIMETALLIC SNAP DISC

BACKGROUND OF THE INVENTION

1. Field of the Invention

The invention relates to a discharge device for a condensate operative within a given temperature range, and including a housing, a valve seat disposed in the housing, closure means cooperating with the valve seat and subjected to an inlet pressure, a bimetallic snap disc carrying the closure means, being supported in the housing, and subjected to the pressure, and moving towards the valve seat upon an increase of temperature within the temperature range.

2. Description of the Prior Art

Condensate discharge devices, in which opening and closing temperatures do not move in parallel with the pressure of the saturation vapor curve, are used primarily where delay-free condensation is not of importance, and where the heat content of the condensate may possibly still be made use of. A bimetallic snap disc causes, as is known, a snap-like opening and closing of the closure means. In known condensate discharge devices of this type, known, for example, from U.S. Pat. No. 1,681,911, a disadvantageous result occurs; namely, during cooling of the bimetallic snap disc, before a jump-wise release of the closure part into a wide-open position, there occurs a slow and steady decrease of the sealing force, by means of which the closure part is pressed onto the valve seat. Only thereafter, and during a further decrease of temperature can the bimetallic snap disc cause the closure part to move into a wide-open position. During appropriate operating conditions, there can, however, already be established an equilibrium during any decrease of the sealing force between the condensate being condensed and discharged, and thus between the opening forces and the closing forces. During such conditions, a jump-wise opening of the closure part does not then occur at all. In such a situation, namely without an adequate sealing force, the condensate discharge device no longer closes reliably. Deposit of contaminations and erosion of the closure location are disadvantageous consequences of such an arrangement.

SUMMARY OF THE INVENTION

It is an object of the invention to devise a condensate discharge device of the aforementioned type, wherein the closure part closes in a jump-like manner at a sealing force adequate for a reliable closure, and maintains an adequate sealing force until it opens in a jump-like manner into a wide-open position from a closure position.

This object is attained in a discharge device for a condensate operative within a given temperature range, and including a housing, a valve seat disposed in the housing, closure means operating with the valve seat, and subjected to an inlet pressure, a bimetallic snap disc carrying the closure means being supported in the housing, subjected to the pressure, and moving towards the valve seat upon an increase of temperature within the temperature range, by providing entrainment means carried by the closure means and being connected to the bimetallic snap disc, and wherein the closure means and the bimetallic snap disc define a central axis, and the closure means is movable along the central axis relative to the bimetallic snap disc, so that the bimetallic snap disc has an opening snap stroke, a closing snap stroke, and a snap stroke portion common with the opening and closing snap stroke, and exerts in a predetermined region a force in a closing direction, and by locating the valve seat so that it is disposed within the predetermined region and within the common snap stroke portion.

In this manner, the bimetallic snap disc comes to rest on the valve seat, according to the inventive condensate discharge device, even prior to the termination of the closure snap stroke of the bimetallic snap disc. Subsequently thereto the bimetallic snap disc carries out the remainder of its closure snap stroke as a relative stroke movement with respect to the closure part. In the closure position, the closure part is pressed to the valve seat at an inlet pressure with an appropriate sealing force. During a decrease of temperature, the bimetallic snap disc at first carries out a part of the relative stroke in a slow and creeping manner, and thereafter passes into a snap state or condition. The bimetallic snap disc then passes rapidly or in a snap-like manner through the remaining relative stroke, and then takes the entrainment means and the closure part in a snap-like manner into a wide-open position, while the sealing force is suddenly reduced to zero. The condensate discharge device is therefore opened, while the full sealing force is still exerted on the closure part. Leakages are therefore reliably avoided.

By adding a stop to the closure means, and wherein the relative movement of the bimetallic snap disc with respect to the closure means is limited in the closing direction by the stop, it is possible to attain an additional sealing force exerting pressure on the closure part in the closure position during a closure temperature. Also, in this case the closure part is always opened abruptly, starting from a position in which the full sealing force is exerted by the inlet pressure on the closure part.

By arranging the condensate discharge device so that the bimetallic snap disc occupies the first position corresponding to a time when the closure means abut the valve seat, when moving in a closure direction, and occupies a second position corresponding to a time when said bimetallic snap disc starts its snap stroke movement in an opening direction, and wherein the relative movement path exceeds the difference between the first and second positions, it is possible to attain a high closure force of the bimetallic snap disc after it suddenly closes, as well as to realize a very high opening energy of the bimetallic snap disk, when it suddenly opens. By providing a spring abutting with one end thereof the bimetallic snap disc, the opening- and closing-temperatures can be displaced without changing the essential function of the condensate discharge device.

By disposing two bimetallic snap discs in series, or juxtaposition, it is possible to implement these two bimetallic snap discs, where each snap disc has a relatively short stroke, and yet realize a relatively large closure stroke for the entire device. In lieu of a single pair of coupled bimetallic snap discs it is also possible, if necessary, to use several pairs in series. In such a case, one end pair carries the closure part, while the other end pair is held in the housing.

BRIEF DESCRIPTION OF THE DRAWING

Other objects and features of the present invention will become apparent from the following detailed description considered in connection with the accompanying drawings, which disclose several embodiments of the invention. It is to be understood that the drawings are to be used for the purposes of illustration only, and not as a definition of the limits of the invention.

In the drawing, wherein similar reference characters denote similar elements throughout the several views.

DESCRIPTION OF THE PREFERRED EMBODIMENTS

Figure 1:
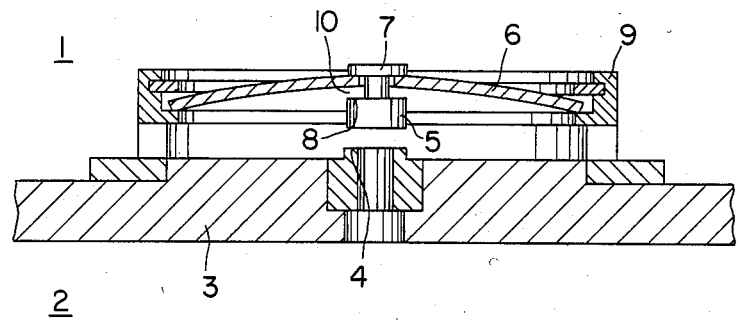
FIG. 1 is an elevational view in cross-section of a first version of a condensate discharge device, according to the present invention, including a bimetallic snap disc.

Referring now to the drawings, and in particular to FIG. 1, a separation wall 3 of a non-illustrated housing of a condensate discharge device is disposed between a region or space 1, in which an inlet pressure is prevailing, and a region or space 2, at which a low or outlet pressure below that in region 1 prevails. A valve seat 4 is disposed in the separation wall 3. A closure part 5 disposed in the pressure region 1 cooperates with the valve seat 4. The closure part 5 is movable relative to a bimetallic snap disc 6 along an axis common to the bimetallic snap disc 6 and the closure part 5, the bimetallic snap disc 6 supporting the closure part 5; additionally entrainment means 7 are carried by the closure part 5, and a stop 8 is disposed on the closure part 5. The side of the bimetallic snap disc 6 having the larger thermal expansion coefficient faces the valve seat 4, and the outer rim of the bimetallic snap disc 6 is held within a recess of a support 9.

If any condensate to be discharged passes through the condensate discharge device, then at low temperatures the force exerted by the pressure on the closure part 5 in a closing direction is lower than the force of the bimetallic snap disc 6 acting on the closure part 5 in an opening direction. Hence, the closure part 5 is in an open position. If the temperature in the condensate discharge device increases, then the bimetallic snap disc 6 and its closure part 5 move in a closure direction. After carrying out a stroke in a slow or creeping manner, and after the snap disc 6 has reached a certain shape, namely at a predetermined temperature, the bimetallic snap disc 6 snaps from a concave position to a convex position, and forces the closure part 5 to abut the valve seat 4. The bimetallic snap disc 6 then carries out the remainder of its snapping movement in the form of a relative stroke 10 with respect to the closure part 5, and finally comes to rest on the stop 8, and exerts a closing force on the closure part 5 in addition to the prevailing inlet pressure. During a falling temperature the bimetallic snap disc 6 first carries out a slow or creeping relative stroke with respect to the closure part 5. During a subsequent opening movement, carried out in a jump-like manner, the bimetallic snap disc 6 comes to rest against the entrainment means 7, and lifts the closure part 5 in a jump-like manner from the valve seat 4, so as to propel it into a wide-open position.

Figure 2:
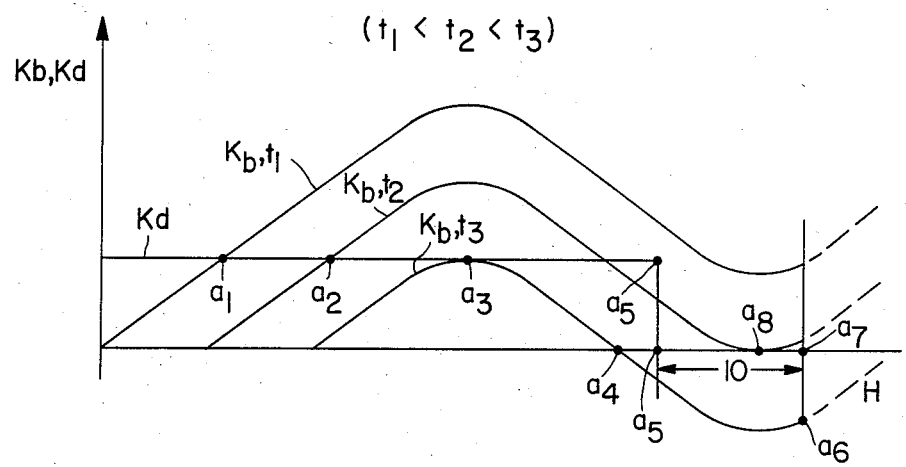
FIG. 2 is a force diagram showing applied force on the ordinate, and stroke position on the abscissa.

The opening- and closure-conditions have been illustrated for clarification in the diagram of FIG. 2. On its ordinate there are shown the force $k_b$ of the bimetallic snap disc 6, and the force $K_d$ resulting from the differential force acting on the closure part 5 due to the difference between the inlet pressure in the region 1 and the outlet pressure in the region 2. On the abscissa are shown the strokes H of the closure part 5 and the bimetallic snap disc 6. The zero point of the coordinate system has been selected for the open position of the condensate discharge device at room temperature, free of any pressure being exerted thereon.

OPERATION

If the bimetallic snap disc 6, during its cold state, is considered to be loaded centrally at a constant temperature $t_1$ in a closure direction, then the force $k_b$ generated by the bimetallic snap disc 6 in an opening direction increases initially during an increasing closing stroke. After a certain disc shape has been reached, or following conclusion of a partial stroke, analogous to the behavior of a cup spring having a high ratio of deflection distance with respect to spring thickness, the force equilibrium in the bimetallic snap disc 6 is reversed. The force $K_b$ thereafter decreases during a further closure stroke, and finally increases again starting from a stroke position defined by the geometry of the disc. The characteristic force lines for given and constant temperatures therefore have a z-shaped course, with a force maximum after a small partial stroke and a force minimum after a larger stroke. At higher temperatures, force $K_b$ is only lower on an overall basis.

The force $K_d$ acting on the closure part 5 in the closure direction remains approximately constant along the stroke for a predetermined pressure.

At constant pressure and increasing temperatures from $t_1$ to $t_2$, the closure part 5 passes from its opening position, while maintaining a stable equilibrium between the forces $K_b$ and $k_d$, through a partial closure stroke corresponding to the distance between the intersecting points $a_1$ and $a_2$. During the closing temperature $t_3$ there arises at the point $a_3$ the maximum force $K_b$ of the bimetallic snap disc 6. At the point $a_3$ the force $K_d$ is a tangent to the sinusoidally shaped curve of the force $K_b$. Due to the subsequent decrease of the force $K_b$ along the closure direction, an equilibrium is no longer possible. The bimetallic snap disc 6 therefore reverses its shape. During the closure snapping stroke, the characteristic force line crosses the zero axis at the point $a_4$, so that the effective direction of the force $K_b$ reverses from an opening direction to the closing direction. Only after a further partial snap stroke is accomplished in the closing direction, does the bimetallic snap disc 6 cause the closure part 5 to abut the valve seat 4 at the point $a_5$. The path $a_5$-$a_s$, shown in the diagram, thus shows the sealing force suddenly exerted on the closure part 5. After deposit of the closure part 5 on the valve seat 4, the bimetallic snap disc 6 carries out its remaining snap movement as a relative stroke 10 with respect to the now resting closure part 5, until it comes to rest on the stop 8, following passage through the force minimum. Thus, the force corresponding to the path $a_6$-$a_7$ acts as an additional sealing force on the closure part 5.

At decreasing temperatures, the additional sealing force corresponding to the path $a_6$ to $a_7$ no longer acts on the closure part 5. Subsequently, the bimetallic snap disc 6 moves within an axial slack existing between it and the entrainment means 7 in an opening direction. The closure part 5, in the meantime, remains seated on the valve seat 4, still exerting a sealing force corresponding to the path $a_5$-$a_s$. Upon reaching the opening temperature $t_2$, the bimetallic snap disc 6 reaches the stroke position $a_8$ and a force minimum. At a position $a_8$ the zero axis is a tangent to the force minimum. Upon a further opening stroke or when a temperature below $t_2$ is reached, the force $K_b$ increases, so that the bimetallic snap disc 6 carries out a snap stroke movement in an opening direction. During the opening snap stroke, and after passage of the slack between the entrainment means 7 and the bimetallic snap disc 6, the bimetallic snap disc 6 engages the entrainment means 7, and lifts the closure part 5 from the valve seat 4, while simultaneously the sealing force decreases in a jump-like manner, so that the closure part 5 is carried therewith to the opening position $a_2$. The valve seat 4 is arranged for this purpose at such a distance ahead of the minimum force corresponding to the point $a_8$, so that the energy becoming available when the bimetallic snap disc 6 engages the entrainment means 7 in an opening direction is sufficient to take the closure part 5 along therewith into the opening position.

The closure part 5 is therefore abruptly lifted from the sealing force previously exerted thereon.

As the stop 8 lies behind the force minimum $a_8$, the slack, namely the maximum relative stroke 10 between the bimetallic snap disc 6 and the closure part 5 exceeds the distance between the stroke position $a_s$ "the closure position" and the stroke $a_8$ "the force minimum". In this manner, the stroke position $a_8$, and therewith the valve seat 4 may be disposed close to the force minimum, so that a particularly large portion of the snap stroke of the bimetallic snap disc 6 is available as an opening- and snap-stroke for the closure part 5.

Figure 3:
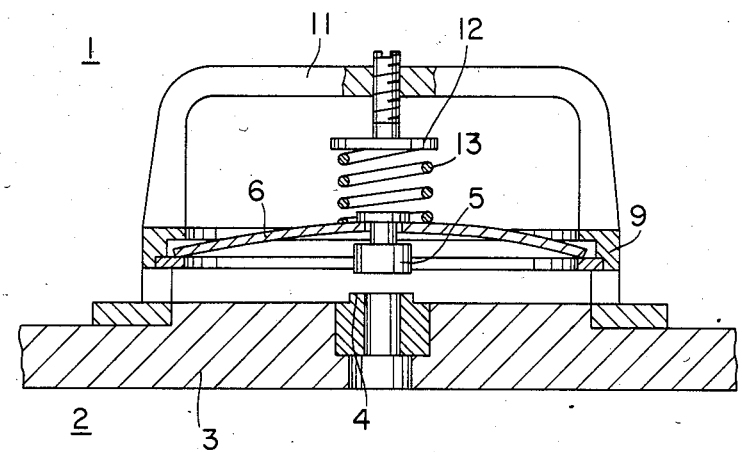
FIG. 3 is an elevational view in section of a second version of a condensate discharge device.

In FIG. 3, the counter-support 9 is provided with an abutment bracket 11, which carries centrally an abutment screw 12. A helical spring 13 abuts the abutment screw 12 with one end thereof, while its other end acts in a closure direction of the bimetallic snap disc 6.

By superposing the force of the helical spring 13 on the force of the bimetallic snap disc 6, the characteristic force field of the bimetallic snap disc 6 is distorted. In this manner, the opening- and closing-temperature of the condensate discharge device can be tailored to a desired condition. The operating conditions described with the aid of FIG. 2 do not change.

Figure 4:
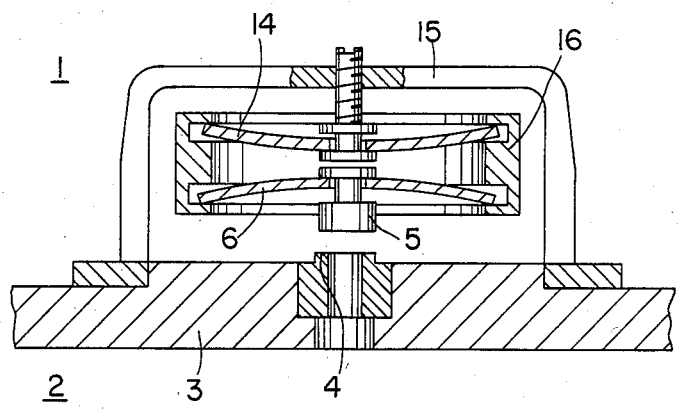
FIG. 4 is an elevational view in cross-section of a third version of a condensate discharge device.

In the implementation according to FIG. 4, two bimetallic snap discs 6 and 14, the respective sides facing each other have a lower thermal expansion coefficient than the opposite outer sides. The bimetallic snap disc 6 carries centrally the closure part 5, which is axially movable, while the other snap disc 14 is held centrally in an abutment bracket 15. The rims of both bimetallic snap discs 6 and 14 are held at an axial spacing from one another in a common and axially movable coupling 16.

Operation of this version of the invention corresponds to the operation described with the aid of FIG. 1. Only the strokes of the bimetallic snap discs 6 and 14 are added.

While only several embodiments of the present invention have been shown and described, it is obvious that many changes and modifications may be made thereunto without departing from the spirit and scope of the invention.

What is claimed is:

1. A steam trap, comprising:
   (a) a steam trap housing;
   (b) a valve seat mounted in said housing;
   (c) a closure part mounted on the supply pressure side of said housing cooperating with said valve seat;
   (d) a support on said housing on the supply pressure side thereof;
   (e) at least one bimetallic snap disc mounted on said support on the supply pressure side of said housing having an opening snap stroke and a closing snap stroke which overlap in a stroke section, the closing snap stroke of said bimetallic snap disc being directed toward said valve seat as the temperature increases and the force exerted thereby acting in the direction of closing of said closure part; and
   (f) an opening cam and a closure stop for said closure part, said bimetallic snap disc engaging said opening cam in the direction of opening of said snap disc and engaging said closure stop in the direction of closing of said snap disc, said opening cam and said closure stop defining therebetween a limited relative stroke of said bimetallic snap disc with respect to said closure part;
   said valve seat being disposed so that the closure part closes on said valve seat within said overlapping stroke section;
   said closure part closing on said valve seat and the opening snap stroke of said bimetallic snap disc commencing within the limited relative stroke of said bimetallic snap disc with respect to the opening cam and closure stop of said closure part.

2. The condensate discharge device as claimed in claim 1, further comprising an abutment means disposed in said housing, and a spring abutting with one end thereof said abutment means, and with another end thereof said bimetallic snap disc.

3. The condensate discharge device as claimed in claim 2, wherein said abutment means is axially adjustable.

4. The condensate discharge device as claimed in claim 2, wherein said bimetallic snap disc has a stroke region between a maximum and minimum force, and has a spring rate within said stroke region, and wherein said spring has a spring rate smaller than said spring rate of said bimetallic snap disc.

5. The condensate discharge device as claimed in claim 1, further comprising a second bimetallic snap disc, each having a side having a thermal coefficient of low expansion compared to an opposite side thereof, said discs having said low thermal coefficient of expansion facing one another, one of said bimetallic snap discs being centrally held in said housing, the other carrying said closure means centrally, and a coupling member movable in an axial direction, outer rims of said bimetallic snap discs being held at a predetermined axial spacing from one another by said coupling member.

* * * * *

UNITED STATES PATENT AND TRADEMARK OFFICE
CERTIFICATE OF CORRECTION

PATENT NO. : 4,586,653

DATED : MAY 6, 1986

INVENTOR(S) : WERNER FOLLER ET AL

It is certified that error appears in the above-identified patent and that said Letters Patent are hereby corrected as shown below:

Cover page,[73], assignee's name should read --Gestra Kondensatableiter GmbH & Co. Kommanditgesellschaft--.

Signed and Sealed this

Fourteenth Day of October, 1986

[SEAL]

Attest:

DONALD J. QUIGG

Attesting Officer

Commissioner of Patents and Trademarks